United States Patent Office 2,805,893
Patented Sept. 10, 1957

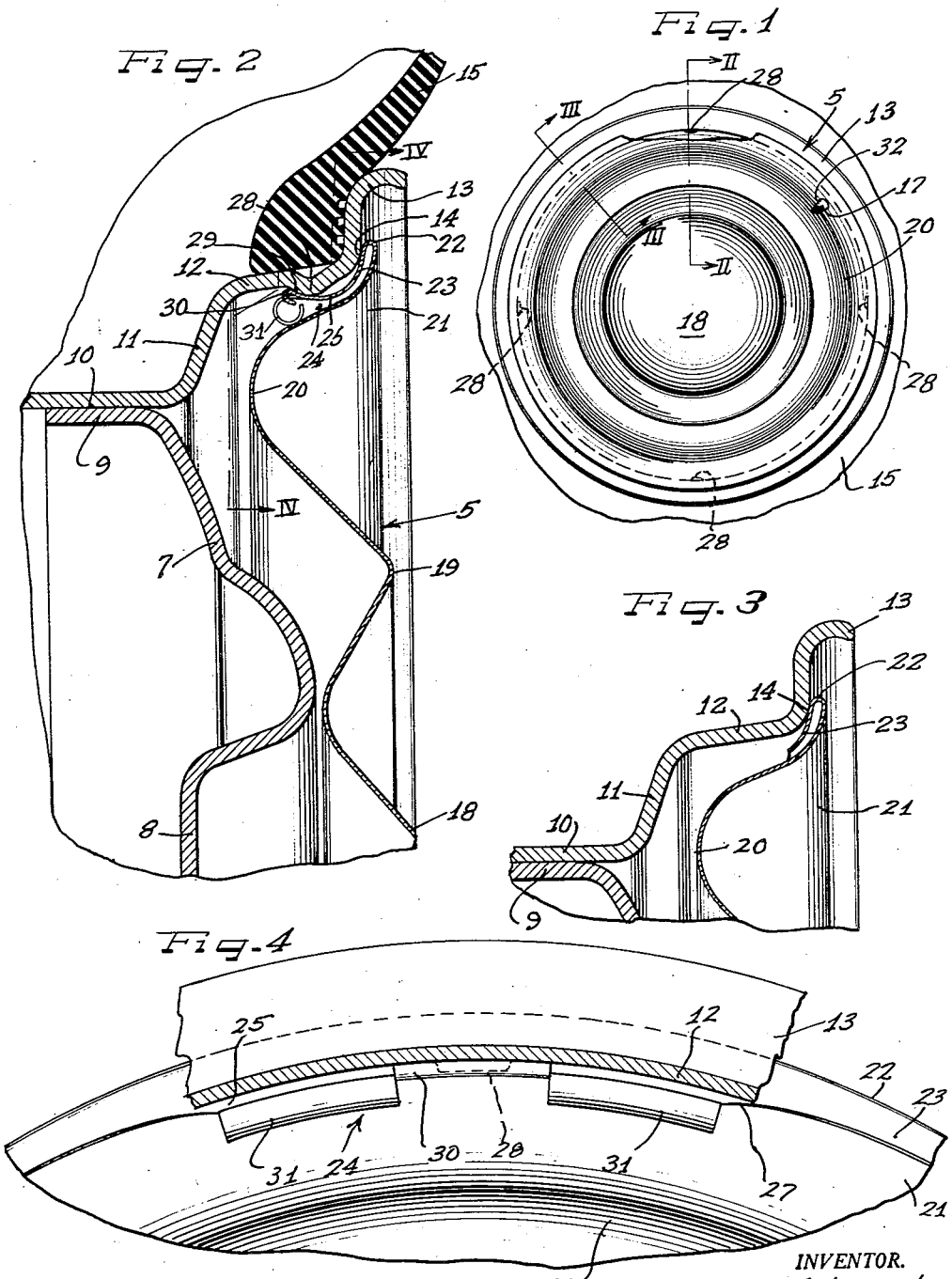

2,805,893
WHEEL COVER

George A. Lyon, Jr., Birmingham, Mich., assignor to Lyon Incorporated, Detroit, Mich., a corporation of Delaware Application March 25, 1955, Serial No. 496,825

9 Claims. (Cl. 301—37)

The present invention relates to improvements in wheel structures and more particularly concerns the ornamental and protective covering of the outer sides of vehicle wheels, such as automobile wheels.

An important object of the present invention is to provide an improved wheel structure wherein a cover is applied to the outer side of a vehicle wheel and has novel retaining finger means utilizing the inherent resiliency of sheet material from which they are made, enhanced by a back-up arrangement creating effective resilient tensioning which reduces the need for reliance upon the inherent resiliency in maintaining efficient inter-engagement of the retaining fingers with a wheel part.

Another object of the invention is to provide an improved wheel cover having individual retaining fingers which are retainingly engageable with a wheel part under resilient tension and enhanced by a novel back-up arrangement of the finger and the cover body.

A further object of the invention is to provide improved retaining finger means for wheel covers, and which the retaining finger means are provided with novel back-up terminal structure for enhancing the resilient tensioning of the fingers in engagement with a wheel part.

Other objects, features and advantages of the present invention will be readily apparent from the following detailed description of a preferred embodiment thereof taken in conjunction with the accompanying drawing in which:

Figure 1 is an outer side elevational view of a vehicle wheel embodying features of the invention;

Figure 2 is an enlarged fragmentary radial sectional view taken along line II—II of Figure 1;

Figure 3 is a fragmentary radial sectional view taken substantially along the line III—III of Figure 1 and on an enlarged scale; and Figure 4 is a fragmentary detail sectional view taken substantially on the line IV—IV of Figure 2.

By way of example the invention is disclosed as embodied in a wheel cover 5 constructed and arranged to be disposed in covering relation at the outer side of a vehicle wheel such as an automobile wheel including a disk spider wheel body 7 having the usual central bolt on flange 8 and axially extending outer marginal attachment flange 9. Carried by the wheel body is a tire rim having a base flange 10 suitably secured to the attachment flange 9 of the body and joining an outer side flange 11, extending generally radially and axially outwardly and merging with an intermediate generally axially outwardly and radially outwardly sloping flange 12 that faces generally radially inwardly and joins the radially extending portion of a terminal flange 13 provided with a shoulder 14 adjacent juncture with the intermediate flange. The tire rim is of the drop center type for supporting a pneumatic tire and tube assembly 15 or a tubeless tire as may be preferred. For inflating the tire a valve stem 17 projects from the side flange 11 of the tire rim.

Although in the present instance, the wheel cover 5 is shown as of the full disk type, that is constructed from a metallic plate or sheet and of a diameter to substantially entirely overlie the outer side of the wheel, including the wheel body and the tire rim, it will be appreciated that if preferred the cover could be a form of annular form associated with a central separable hub cap on the wheel. In any event, the wheel cover 5 is made from suitable thin gauge metallic plate or strip susceptible of being readily formed by stamping or other sheet metal shaping operations and adapted to be suitably externally finished such as by polishing and plating to afford a lustrous finish. Materials suitable for this purpose are various grades of steel, including stainless steel, rolled brass, and other alloys such as aluminum alloys.

In the illustrated instance, the wheel cover 5 includes a central crown portion 18 adapted to overlie the center of the wheel on bolt on flange 8 and having annularly thereabout a reenforcing and decorative rib 19 from which the cover dips annularly inwardly to provide an annular dished portion 20 arranged to extend into the substantial groove between the wheel body and the tire rim. At the radially outer side of the dish portion 20 is the generally radially and axially outwardly extending marginal portion 21 which is arranged to overlie the intermediate flange 12 and the shoulder 14 of the tire rim. At its extremity the outer marginal cover portion 21 is provided with a turned finishing and reenforcing edge structure or bead 22 with an underturned generally radially inwardly extending flange 23 of annular form extending as a continuation thereof behind the cover margin and arranged to seat against the tire rim shoulder 14 in assembly with the wheel.

As best seen in Fig. 3, the underturned flange 23 is dimensioned to extend inwardly to a smaller diameter than the diameter of the axially outer portion of the inner face of the intermediate flange 12 of the tire rim, and that the outwardly sloping marginal cover portion 21 is disposed on a substantially smaller diameter than the intermediate flange 12 and is generally convergently related thereto so as to afford an axially inwardly widening annular gap between the cover body and the tire rim flange 12. Within this gap are accommodated circumferentially spaced series of generally axially inwardly extending cover retaining fingers 24 provided as homogeneously integral extensions from the inner extremity of the cover flange 23.

Each of the retaining fingers 24 includes an axially elongated body 25 of substantial width with tapering sides 27 (Fig. 4) merging toward juncture with the extremity of the underturned cover flange 23. Herein four of the fingers 24 may be provided, matching the disposition of four cover retaining bumps 28 pressed into the axially outer portion of the tire rim intermediate flange 12 to project generally radially inwardly and provide generally axially and radially inwardly facing cover retaining respective shoulders 29.

For retaining engagement with the bump shoulders 29, the respective retaining fingers 24 are provided at the inner extremities of the body portions 25 thereof with turned substantially stiff generally radially outwardly projecting retaining terminals 30. By engaging under resilient tensioned thrust of the retaining finger body 25 in each instance the stiff turned terminal 30 grips the bump shoulder 29 cammingly and draws the underturned marginal cover flange 23 snugly against the rim shoulder 14.

In order to enhance the resilient pressure of the retaining finger terminals 30 against the retaining bumps, novel back up tensioning and resiliency enhancing portions 31 are provided on the retaining finger terminals at the opposite sides of the respective bump engaging terminal portions 30 of the fingers which are thereby disposed centrally of the finger bodies 25. The backing up relationship of the side terminal portions 31 may be accomplished as shown by having the terminal portions 31 projecting radially inwardly rather than radially outwardly as by having the same of substantially larger curl diameter than the bump engaging terminal portions 30, and also by having the central or bump engaging portions 30 separated from (although not necessarily so) and projecting radially outwardly relative to the plane of the finger body 25 while the back up terminal portions 31 are in the plane of the finger body at the radially outer side of the finger but project radially inwardly relative to the radially inner plane of such body. In any event, the construction and relationship is such that when the retaining finger terminals 30 are in full retaining engagement with the retaining bumps 28, the back up terminal portions 31 are firmly backed up against the opposing back surface of the cover body and more particularly the portion thereof at the radially outer side of the dished cover section or portion 20. Since the retaining finger bodies 25 are of substantial width, and curved transversely corresponding substantially to the circumference of the cover, substantial resilience for adequate radial deflection of the retaining terminal portions 30 is afforded to enable snapping of the retaining fingers over the retaining bumps. Such resilient yielding of the fingers is also implemented by the relatively large diameter curls of the back up terminal portions 31 which are resiliently yieldable by curling upon themselves under substantial radially inward pressure on the fingers and then expand resiliently to press the terminal portions radially outwardly as a result of the resilient reaction of the inner free terminal portions of the back up curls against the wheel cover body.

In applying the cover 5 to the outer side of the wheel, a valve stem opening 32 in the dished cover portion 20 is registered with the valve stem 17, thereby locating the retaining fingers 24 in proper registration with the retaining bumps 28. In the untensioned, normal or unassembled relation of the retaining fingers 24, they project at the retaining terminals 30 to a larger diameter than the diameter described about the retaining shoulders 29 of the bumps, substantially as shown in dash outline in Fig. 2. In this condition the fingers are reasonably easily radially yieldable resiliently so that as the cover is pressed axially inwardly into position on the wheel, the retaining terminals 30 will cam axially and radially inwardly along the outer lead-in slope of the retaining bumps 28 until the back up terminal curl sections or portions 31 engage against the opposing cover body portions and thereby increase the resistance to resilient radially inward yielding of the fingers. In response to increased axially inward pressure against the cover and more particularly the outer margin thereof, however, sufficient radially inward deflectional resilient yielding of the retaining finger terminals is accomplished to pass the radially inward tips of the retaining bumps 28. Thereupon, the retaining terminal portions 30 snap in behind the retaining bumps into strong retaining resiliently tensioned interengagement with the retaining bump shoulders for effectively holding the cover against unintentional displacement from the wheel.

Removal of the cover is accomplished by reverse action from the application of the cover to the wheel. That is, a pry-off tool such as a screw-driver or the like is inserted between the outer extremity of the cover and the tire rim and pry-off leverage force applied to snap the respective retaining fingers free from the retaining bumps.

Cross reference is made to my copending application Serial No. 479,554, filed January 3, 1955, of which the present application is a continuation-in-part and in which copending application the generic aspects of the invention are covered.

It will be understood that modifications and variations may be effected without departing from the scope of the novel concepts of the present invention.

I claim as my invention:

1. In a wheel structure including a generally radially facing annular portion, a cover for disposition at the outer side of the wheel including a cover body having a portion for overlying said wheel portion and extending in radially spaced general opposition to said wheel portion, and a cover retaining finger carried by said cover portion therebehind and projecting generally axially and being generally radially resiliently yieldable, said finger having a terminal portion with a central part thereof retainingly engageable with said wheel portion and side portions of the terminal separated from said central part and engageable in tensioning back up relation against said cover body portion while the central terminal part retainingly engages said wheel portion.

2. In a wheel structure including a generally radially facing annular portion, a cover for disposition at the outer side of the wheel including a cover body having a portion for overlying said wheel portion and extending in radially spaced general opposition to said wheel portion, and a cover retaining finger carried by said cover portion therebehind and projecting generally axially and being generally radially resiliently yieldable, said finger having a terminal portion with a central part thereof retainingly engageable with said wheel portion and side portions of the terminal separated from said central part and engageable in tensioning back up relation against said cover body portion while the central terminal part retainingly engages said wheel portion, said wheel portion having a retaining bump projecting therefrom and providing a retaining shoulder and said central terminal part comprising a turned stiff structure engageable with said shoulder.

3. In a wheel structure including a generally radially facing annular portion, a cover for disposition at the outer side of the wheel including a cover body having a portion for overlying said wheel portion and extending in radially spaced general opposition to said wheel portion, and a cover retaining finger carried by said cover portion therebehind and projecting generally axially and being generally radially resiliently yieldable, said finger having a terminal portion with a central part thereof retainingly engageable with said wheel portion and side portions of the terminal engageable in tensioning back up relation against said cover body portion while the central terminal part retainingly engages said wheel portion, said back up terminal portions being in the form of curls of substantial diameter with free terminal portions thereof resiliently shouldering against said cover portion.

4. In a wheel structure including a generally radially facing annular portion, a cover for disposition at the outer side of the wheel including a cover body having a portion for overlying said wheel portion and extending in radially spaced general opposition to said wheel portion, and a cover retaining finger carried by said cover portion therebehind and projecting generally axially and being generally radially resiliently yieldable, said finger having a terminal portion with a central part thereof retainingly engageable with said wheel portion and side portions of the terminal separated from said central part and engageable in tensioning back up relation against said cover body portion while the central terminal part retainingly engages said wheel part, said central terminal portion projecting radially beyond the plane of the finger toward the wheel portion and the back up terminal portions projecting radially beyond the plane of the finger toward the cover portion.

5. In a cover for disposition at the outer side of a vehicle wheel, a circular cover body having an underturned marginal flange from which project generally axially inwardly behind the cover a plurality of circumferentially spaced cover retaining fingers of sheet metal resiliently deflectable radially and provided with terminals having central retaining portions for engagement with a wheel part and side portions of the terminals severed from the central portions and offset therefrom for back up engagement against an adjacent portion of the cover to enhance the resiliency of the fingers during engagement of the retaining terminal portions with a wheel part.

6. In a cover for disposition at the outer side of a vehicle wheel, a circular cover body having an underturned marginal flange from which project generally axially inwardly behind the cover a plurality of circumferentially spaced cover retaining fingers resiliently deflectable radially and provided with terminals having central retaining portions for engagement with a wheel part and side portions of the terminals severed from the central portions and offset therefrom for back up engagement against an adjacent portion of the cover to enhance the resiliency of the fingers during engagement of the retaining terminal portions with a wheel part, said fingers comprising homogeneously integral extensions from said underturned flange and possessing inherent resiliency normally causing the side portions of the fingers to spring away from said cover portion.

7. In a cover for disposition at the outer side of a vehicle wheel, a circular cover body having an underturned marginal flange from which project generally axially inwardly behind the cover a plurality of circumferentially spaced cover retaining fingers resiliently deflectable radially and provided with terminals having central retaining portions for engagement with a wheel part and side portions for back up engagement against an adjacent portion of the cover to enhance the resiliency of the fingers during engagement of the retaining terminal portions with a wheel part, said fingers comprising homogeneously integral extensions from said underturned flange and possessing inherent resiliency normally causing the fingers to spring away from said cover portion, said finger terminals having the central engagement and side back up portions thereof severed and relatively offset in opposite radial directions.

8. In a cover for disposition at the outer side of a vehicle wheel, a circular cover body having an underturned marginal flange from which project generally axially inwardly behind the cover a plurality of circumferentially spaced cover retaining fingers resiliently deflectable radially and provided with terminals having central retaining portions for engagement with a wheel part and side portions for back up engagement against an adjacent portion of the cover to enhance the resiliency of the fingers during engagement of the retaining terminal portions with a wheel part, said fingers comprising homogeneously integral extensions from said underturned flange and possessing inherent resiliency normally causing the fingers to spring away from said cover portion, said finger terminals having the central engagement and side back up portions thereof relatively offset in opposite radial directions, said central finger terminal portions being in the form of curls of smaller diameter than the back up portions of the terminals.

9. In a cover for disposition at the outer side of a vehicle wheel, a circular cover body having an underturned marginal flange from which project generally axially inwardly behind the cover a plurality of circumferentially spaced cover retaining fingers resiliently deflectable radially and provided with terminals having central retaining portions for engagement with a wheel part and side portions for back up engagement against an adjacent portion of the cover to enhance the resiliency of the fingers during engagement of the retaining terminal portions with a wheel part, said fingers comprising homogeneously integral extensions from said underturned flange and possessing inherent resiliency normally causing the fingers to spring away from said cover portion, said finger terminals having the central engagement and side back up portions thereof relatively offset in opposite radial directions, said central finger terminal portions being in the form of curls of smaller diameter than the back up portions of the terminals, said back up terminal portions comprising curls of larger diameter than the central curl portion and having resiliently yieldable terminal portions thereof for backing against the cover portion.

References Cited in the file of this patent

UNITED STATES PATENTS 2,675,272    Hautau  ---------------- Apr. 13, 1954